United States Patent
Grabbe et al.

[11] Patent Number: 5,902,636
[45] Date of Patent: May 11, 1999

[54] METHOD FOR CHEMICAL SURFACE MODIFICATION OF FUMED SILICA PARTICLES

[75] Inventors: Alexis Grabbe, Albuquerque; Terry Arthur Michalske, Cedar Crest; William Larry Smith, Albuquerque, all of N.M.

[73] Assignee: Lucent Technologies Inc., Murray Hill, N.J.

[21] Appl. No.: 08/953,263

[22] Filed: Oct. 17, 1997

Related U.S. Application Data

[62] Division of application No. 08/261,565, Jun. 17, 1994, Pat. No. 5,736,245.

[51] Int. Cl.⁶ ........................................ B05D 7/00
[52] U.S. Cl. ...................... 427/221; 423/335; 423/336; 423/337
[58] Field of Search .................... 423/335, 336, 423/337; 427/220, 221

[56] References Cited

U.S. PATENT DOCUMENTS

| | | | |
|---|---|---|---|
| 2,563,288 | 8/1951 | Steinman | 428/391 |
| 4,539,061 | 9/1985 | Sagiv | 156/278 |
| 4,554,147 | 11/1985 | Stoll et al. | 423/335 |
| 4,642,265 | 2/1987 | Suzuki | 428/391 |
| 4,660,927 | 4/1987 | Kondow et al. | 428/391 |
| 4,697,877 | 10/1987 | Hida et al. | 428/391 |
| 4,733,942 | 3/1988 | Hida et al. | 428/391 |
| 4,778,721 | 10/1988 | Sliemers et al. | 428/447 |
| 5,124,374 | 6/1992 | Baker et al. | 428/375 |
| 5,130,194 | 7/1992 | Baker et al. | 428/367 |
| 5,136,679 | 8/1992 | Broer et al. | 385/128 |
| 5,342,597 | 8/1994 | Tunison | 423/335 |
| 5,378,521 | 1/1995 | Ogawa | 428/391 |
| 5,415,927 | 5/1995 | Hirayama et al. | 428/447 |
| 5,445,886 | 8/1995 | Ogawa | 428/391 |
| 5,464,704 | 11/1995 | Yoneda et al. | 428/447 |
| 5,482,768 | 1/1996 | Kawasato et al. | 428/447 |
| 5,736,245 | 4/1998 | Grabbe et al. | 428/391 |

*Primary Examiner*—Michael Lusignan

[57] ABSTRACT

Dehydroxylated, silica-containing, glass surfaces are known to be at least partially terminated by strained siloxane rings. According to the invention, a surface of this kind is exposed to a selected silane compound or mixture of silane compounds under reaction-promoting conditions. The ensuing reaction results in opening of the strained siloxane rings, and termination of surface atoms by chemical species, such as organic or organosilicon species, having desirable properties. These species can be chosen to provide qualities such as hydrophobicity, or improved coupling to a polymeric coating.

1 Claim, 5 Drawing Sheets

METHOD FOR CHEMICAL SURFACE MODIFICATION OF FUMED SILICA PARTICLES

This is a division of application Ser. No. 08/261565 filed Jun. 17, 1994 now U.S. Pat. No. 5,736,245.

GOVERNMENT CONTRACT

This invention was made with Government support under Funds-In Agreement No. DE-FI04-88AL54100, awarded by The United States Department of Energy. The government has certain rights in this invention.

FIELD OF THE INVENTION

The invention relates to surface treatments for silica-containing glass, and in particular, to treatments for the purpose of suppressing corrosion of the glass surface by moisture, and treatments for the purpose of promoting adhesion to a polymeric coating. In a specific embodiment, the invention relates to such surface treatments in the manufacture of polymer-clad fiber-optic cables.

ART BACKGROUND

A freshly formed, silica-containing, glass surface will include a distribution of reactive sites that may include structural surface defects. It is well known that atmospheric moisture will react with these sites, leading to the attachment of hydroxyl groups to silicon atoms. As a result, a glass surface that has been exposed to the ambient atmosphere for a substantial period of time may be described as a "silanol-terminated" surface.

It is conventional to use silane coupling agents, such as $RSi(OMe)_3$ in the example below, to improve the adhesion of polymers to a silanol-terminated surface. Thus, for example, the water-mediated reactions:

$$RSi(OMe)_3 + H_2O + HOSi\equiv \rightarrow MeOH + [RSi(OMe)_2]OSi\equiv + H_2O$$

$$2[RSi(OMe)_2]OSi\equiv + H_2O \rightarrow 2MeOH + \equiv SiO[R(OMe)]SiOSi[R(OMe)]OSi\equiv$$

provide a cross-linked siloxane surface that contains covalent coupling points R for a subsequent organic reaction with a polymer.

Such reactions may be useful for promoting the adhesion of an optical fiber to a polymeric jacket material. Even absent such jacket material, reactions of this kind may be useful for attaching chemical species to the glass surface that are effective for reducing the affinity of the surface, or of the glass-polymer interface, to water. For both of these reasons, a surface reaction of this kind may be able to impart desirable properties to glass fibers for use, e.g., in fiber-optic cables.

However, a surface treatment that relies upon the availability of a silanol-terminated surface will not, in general, be the most economical or effective treatment to use in optical fiber manufacture. This is because in large-scale fibermaking operations, the application of the polymeric coating is typically integrated in a continuous process that begins with drawing of fresh fiber from a heated preform, and ends with winding the coated fiber on a spool. The freshly drawn glass will not have a silanol-terminated surface. Instead, it will have a nearly dehydroxylated surface that is partially terminated by strained and unstrained siloxane rings.

In fact, there are known surface reactions that can attach organic species directly to a dehydroxylated glass surface. These reactions are described, for example, in L. H. DuBois et al., *J. Amer. Chem. Soc.* 115 (1993) 1190–1191, and L. H. DuBois et al., *J. Phys. Chem.* 97 (1993) 1665–1670. As discussed there, an alkoxy silane can react directly with a type of surface defect referred to as a "strained siloxane dimer ring," or, in reference to its geometrical configuration, as an "edge-shared tetrahedral defect." However, the resulting surface product contains a hydrolyzable alkoxy ester. This is undesirable because it may provide a nucleation site for the condensation of water. This, in turn, can weaken an optical fiber by way of a stress-induced corrosion mechanism. Moreover, the alkoxy ester is undesirable as a coupling point between the glass surface and a polymeric coating, because the adhesive bond to the polymer will be hydrolytically unstable. The surface reaction and subsequent hydrolysis are illustrated in FIG. 1.

Thus, practitioners in this field have hitherto failed to provide an effective chemical treatment for dehydroxylated glass surfaces, that affords protection from moisture and can promote adhesion to polymeric coatings.

SUMMARY OF THE INVENTION

A desirable reactant, for the purposes described above, would produce a surface which is terminated by desirable coupling or passivating chemical groups. These chemical groups will typically be chosen to be intrinsically hydrolytically stable, or hydrolytically stable after a subsequent reaction with an organic compound (such as a polymer). We have discovered that certain silane compounds are readily used to achieve this result. They are those compounds of silicon that have at least one Si—H group and/or at least one Si—O—Si group.

The reaction should be carried out such that: oxygen atoms belonging to the glass surface form chemical bonds with silicon atoms of the silicon compound; silicon atoms belonging to the surface form chemical bonds with hydrogen or oxygen atoms of the silicon compound; and the chemical reaction results in no net increase in the number of O—H bonds at the surface. (In many cases, in fact, it will be possible to carry out the reaction such that no new O—H bonds are formed.) Because alkoxysilanes tend to be hydrolytically unstable, the reaction should further be carried out such that no oxygen atom is simultaneously bound to a silicon atom and a carbon atom in any product of the reaction.

Included in the class of useful compounds are: silane; the siloxanes and their analogs; the cyclosiloxanes and their analogs; the organo-H-silanes and their analogs, and the organosiloxanes and their analogs.

In these reactions, the strained dimer ring is opened by the breaking of a Si—O bond. A new bond is made between the exposed oxygen atom and a silicon atom of a silane species (which may be a siloxane, organo-H-silane, or organosiloxane species). A new bond is made between the exposed silicon atom and either a hydrogen atom, or an oxygen atom of a siloxane species (which may be an organosiloxane species).

Significantly, these reactions conserve the number and kinds of bonds in the reacting molecules. Consequently, the driving force for the reaction is provided substantially by the release of the ring strain at the surface site. We have found that, surprisingly, the reaction kinetics are rapid enough to provide a practical method for functionalizing a dehydroxylated surface of silica-containing glass, such as a high-temperature formed silica surface.

DETAILED DESCRIPTION

Figure 1:
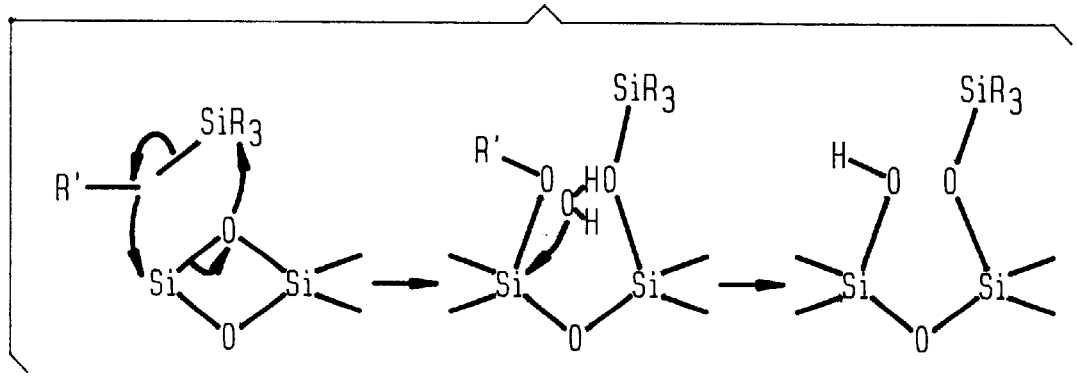
FIG. 1 represents, using structural formulas, surface reactions of the prior art in which an organic species is attached to a glass surface and subsequently hydrolyzed.
Figure 2:
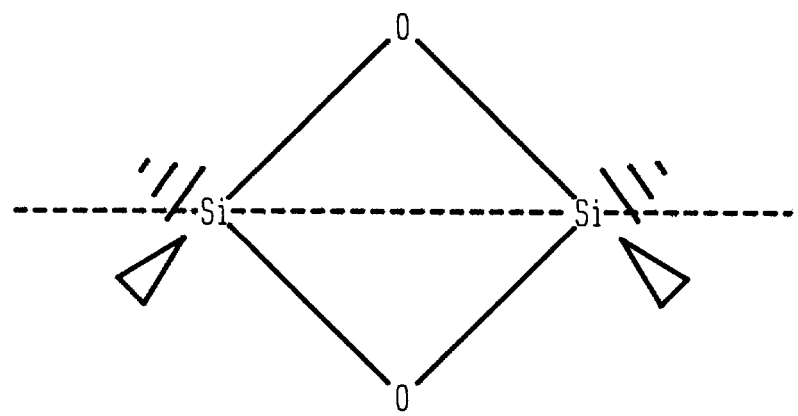
FIGS. 2 and 3 represent strained dimer rings that are present at dehydroxylated surfaces of silica-containing glass.
Figure 3:
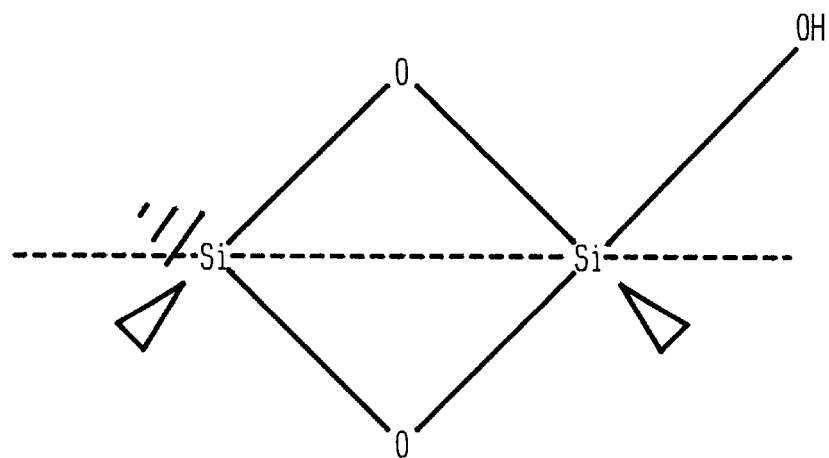

From infrared spectroscopic evidence, we have estimated that strained dimer rings cover about 2%–3% of the dehydroxylated surface. This is equivalent to 0.2–0.4 reactive sites per $nm^2$. These rings may exist in several forms, the two most likely of which are shown in FIG. 2 (the so-called $d_4$ form) and FIG. 3 (the so-called $d_3$ form). (See, e.g., T. A. Michalske et al., *J. App. Phys.* 56 (1984) 2686, and B. C. Bunker et al., *Surf. Sci.* 222 (1989) 95–118.) We have found that the $d_4$ form is the more reactive of these, and that this form accounts for at least 25% of all the strained ring sites.

Hereinafter, a glass surface will be referred to as "siloxane terminated" if it has at least about 0.005 strained dimer rings per $nm^2$.

Figure 4:
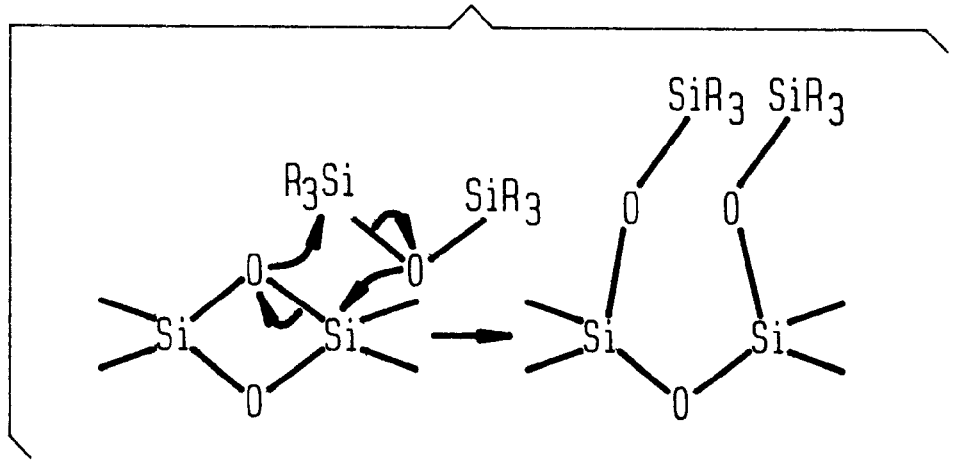
FIGS. 4 and 5 represent alternative surface reactions according to the invention in some embodiments.

An exemplary reaction, according to the invention, is shown in FIG. 4. Here, a generic siloxane compound $R_1 R_2 R_3$ Si—O—Si$R_4 R_5 R_6$ is reacted with a strained dimer ring ≡Si($O_2$) Si≡. In this representation, each of the symbols $R_1$–$R_6$ represents (subject to certain constraints) any species selected from hydrogen atoms, organic species and their analogs, silane species and their analogs, organosilane species and their analogs, and organosiloxy species and their analogs. As noted, however, alkoxysilanes are generally undesirable as reactive compounds, due to hydrolytically unstable end products that would be produced on the surface. In some cases, chlorosilanes, silazanes, and silamines may also be undesirable for similar reasons.

In each radical R, the atom bonded directly to the corresponding silicon atom of the ≡Si—O—Si≡structure must be either hydrogen, carbon, or oxygen.

Figure 5:
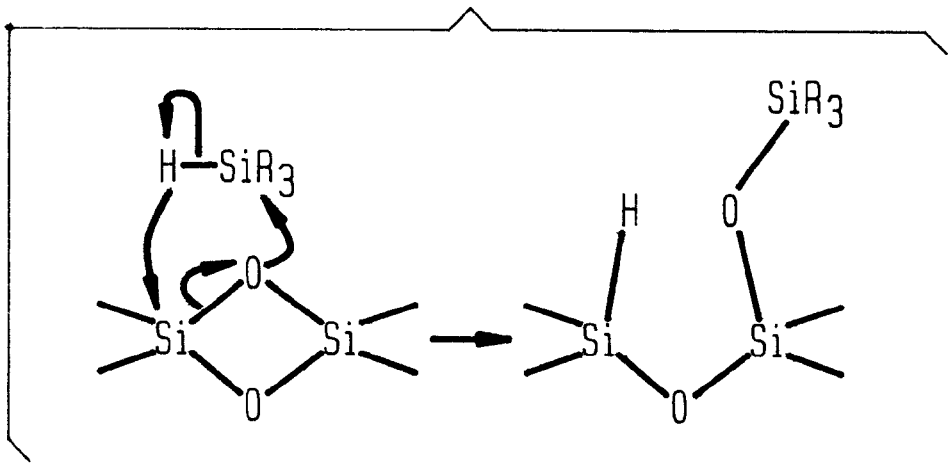

An alternative reaction is shown in FIG. 5. Here, the dimer ring is 30 reacted with $SiH_4$ or a derivative thereof. This reaction results in the hydrogenation of the exposed dimer silicon atom. With respect to the exposed dimer oxygen, this reaction is similar to the reaction of FIG. 4.

In regard to either type of reaction, it is well known that the unstrained SiOSi structure produced by the ring opening is far less susceptible to hydrolysis than are the alkoxy esters.

Figure 6:
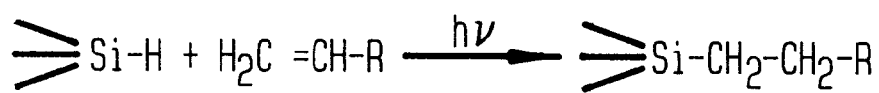
FIG. 6 represents a general photocatalyzed reaction between a glass surface and a vinylated species.

One terminal group that is readily produced by either of these types of reaction is the group ≡SiH. This is one of many groups that can couple a polymeric coating to the glass surface. For example, FIG. 6 illustrates a photocatalyzed reaction between =SiH and a vinylated species $H_2C$=CH— R. This reaction is described in W. Noll, *Chemistry and Technology of Silicones*, Academic Press, New York, 1968. The actinic radiation for catalyzing this reaction can, in at least some cases, be provided by the same light source used to photocure the polymeric coating. This is convenient where, for example, the polymeric coating is applied to optical fiber in a continuous process integrated with the drawing of the fiber.

A partial list of the silane (including siloxane) compounds that can be used to terminate dehydroxylated glass surfaces appears in the Appendix. Currently preferred compounds are: hexamethyldisiloxane (hMdS), 1,1,3,3 tetraMethyldiSiloxane (tMdS), 1,1,3,3 tetraVinyldiMethyldiSiloxane, 1,3 di(3-AminoPropyl)diMethyldiSiloxane, 1,3 di(3-MercaptoPropyl)diMethyldiSiloxane, the MethytHydrocycloSiloxanes, hexaMethylcyclotriSiloxane (hMctS), isomers of tri(MethylHydro)cyclotriSiloxane, pentaMethylcyclotriSiloxane, EthylSilane (EtS), diMethylsilane, and the (MethylHydro)polySiloxanes.

Among these compounds, we found that tMdS, in particular, reacts quickly enough to be used in the processing of optical fiber. As discussed below, we reacted this compound with dehydroxylated silica particles having a surface area of about $200g/m^2$. We found that at a surface temperature of about 480° K., the surface reaction was substantially complete after about one second in the presence of tMdS vapor at 200 torr of pressure. (The vapor pressure of this chemical is 200 torr at 30° C.) The total exposure is the integral of the reactive vapor pressure as a function of time. Thus, in this case, the exposure was about 200 torr-s. Because we believe that this dose caused more than 99% of the strained dimer rings to react, we estimate that this treatment will provide about 0.3 covalent coupling points per $nm^2$ of surface area. (In general, a reaction more than 90% complete will be considered "substantially complete.")

For processing optical fibers or other glass-comprising articles, it will generally be desirable to perform the reactive exposure before the article has come into contact with a substantial dose of water vapor. By "substantial dose" is meant sufficient exposure to impair the useful properties imparted by the inventive surface treatment, Thus in typical cases, it will be desirable to avoid any exposure to water vapor, prior to the desired reactive exposure, that would result in terminating more than about 10% of the available reactive sites with OH.

Figure 7:
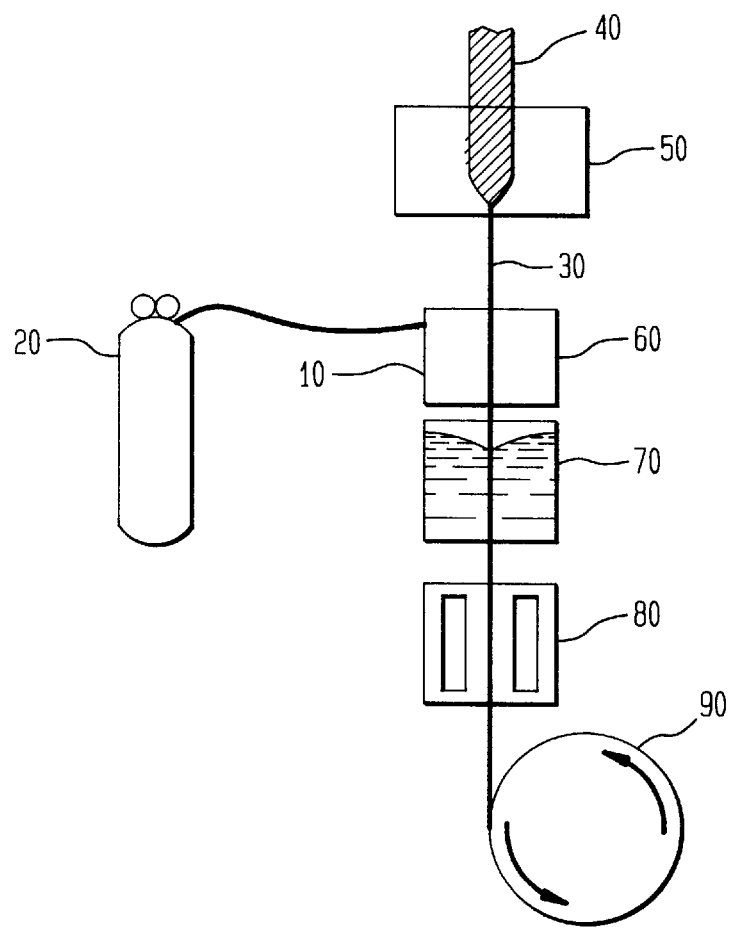
FIG. 7 schematically represents a method for making fiber-optic cable according to the invention in one embodiment.

In an exemplary fiber production operation, as depicted schematically in FIG. 7, a reaction zone 10, exemplarily one meter long, can be added to a fiber draw tower. Within the reaction zone, a controlled atmosphere from source 20 is maintained about the unfinished cable. In this zone, fiber 30, freshly drawn from preform 40 in furnace 50, will pass through gas-phase reactor 60. Heat will be provided either as residual heat in the fiber, or from heat sources associated with the reactor. The fiber will pass through the reactor at a speed in the range 1–100 m/s (speeds of about 10 m/s are typical). The fiber speed, surface temperature, and reactant vapor pressure will be adjusted such that the surface reaction is substantially completed during passage through the reaction zone. The surface-modified fiber will then pass to processing station 70 and 80 for respectively applying and curing the polymer coating. The polymer-coated fiber is then wound on capstan 90. It is expected that by this means, improved moisture resistance can be imparted to optical cable with only a modest increase in production cost.

In at least some cases, it may be desirable to use this surface modification to control the degree of adhesion between the fiber surface and the polymeric coating. That is, if the adhesion is too weak, debonding may occur, which causes optical attenuation losses in the fiber due to a microbending mechanism. On the other hand, if adhesion is too strong, it is difficult for workers to strip the ends of optical cables to prepare them for splicing or installation. A mixture of chemicals can be selected, which includes a relatively strong adhesion promoter, diluted with a second chemical (and possibly others) that is effective for passivating the glass surface, but contributes relatively weak adhesion, if any, to the polymeric coating.

One example of such a mixture is a 1:1 (with respect to gas-phase density) mixture of hMctS and tMdS. These two chemicals react at nearly identical rates, but the contribution of hMctS to the adhesion is negligible relative to that of tMdS. As a consequence, this mixture will lead to about half the adhesion produced by tMdS alone.

Figure 8:
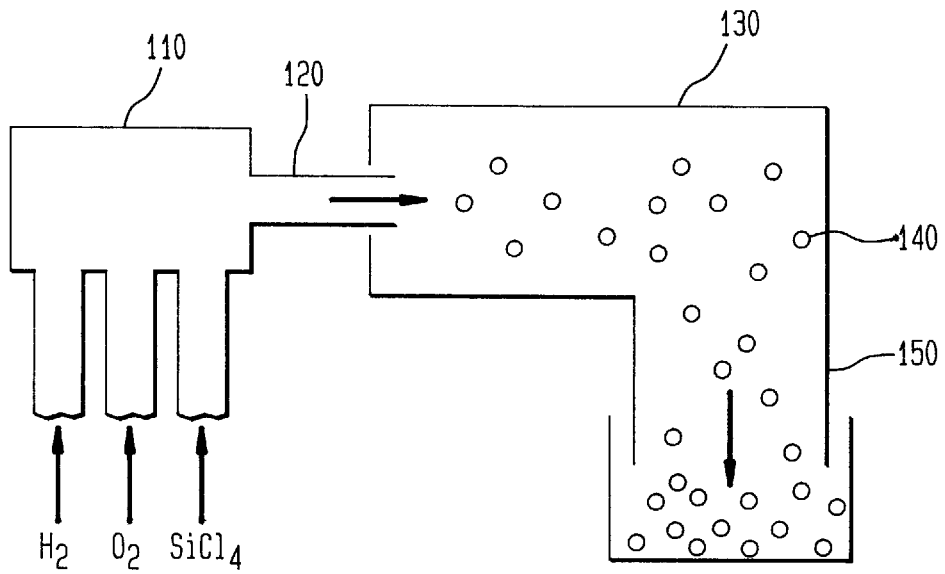
FIG. 8 schematically represents a method for modifying the surfaces of fumed silica particles, according to the invention in one embodiment.

Another useful application of the inventive surface treatment is for the in situ modification of fumed silica surfaces for use as, e.g. a filler material. For example, it is well known that fumed silica particles can be made in, and ejected from, a tetrachlorosilane burner. As depicted schematically in FIG. 8, the outlet 120 of such a burner 110 will be readily attached to the inlet of a reactor 130, such as a gas-phase reactor, containing a controlled atmosphere comprising vapors or aerosols of appropriate silane compounds. The temperature and reactive vapor pressure (or equivalent pressure in the case of aerosols) in the reactor will be adjusted to substantially complete the desired surface reaction within an appropriate residence exemplarily 0.5 s. During this residence time, the fumed silica 140 will pass through the reactor and into a bagging outlet 150, similar to the bagging outlets of conventional burners for fumed silica production. We expect that the modified silica that results from this process will exhibit improved moisture resistance relative to conventional fumed silica products, and win in at least some cases exhibit improved adhesion to the surrounding matrix material, resulting in better mechanical stability. We believe that this can be achieved with only modest modification of conventional plant equipment.

Yet another useful application of the inventive surface treatment is for passivating silicon dioxide surface layers on silicon substrates. For example, several steps in the manufacture of silicon integrated circuits include the formation of a silicon dioxide surface layer on a silicon wafer. This layer may be formed, in some cases, by in situ oxidation, and in other cases by a deposition process. In either case, it is often desirable to protect such a layer from corrosion by moisture.

Another kind of device formed on a silicon substrate is a planar glass waveguide, which comprises numerous silica-containing layers. It will often be desirable to protect at least certain of these layers, such as the uppermost layer, from corrosion by moisture.

Silicon micromachines are yet a third kind of device which may be improved by a chemical surface treatment. In these devices, a native silicon dioxide surface layer is Generally present. It will often be desirable to treat these surfaces to provide a stable, low friction interface between moving parts, and to protect the device from moisture.

We believe that our surface treatment will be useful for the protection of devices of these illustrative kinds. An appropriate silane chemical (or mixture of chemicals) may be applied to the wafer (or other silicon substrate) surface in a gas-phase reactor. Alternatively, a liquid silane chemical (or mixture) may be applied. (In the case of flat substrates, spinning may be an appropriate liquid-application process.)

As yet another alternative, a low-vapor-pressure silane or mixture may be applied in the form of an aerosol. Appropriate sources of heat for promoting the surface reaction will be well known to practitioners in the art of semiconductor fabrication, and need not be described in detail.

In regard to the cyclic compound hMctS, we have found evidence of surface-catalyzed polymerization. That is, at the dehydroxylated glass surface, strained dimer rings can open and fuse with a molecule of hMctS. This leads to an even larger ring, pinned to the reactive surface site. This reaction is illustrated in FIG. 9.

Figure 9:
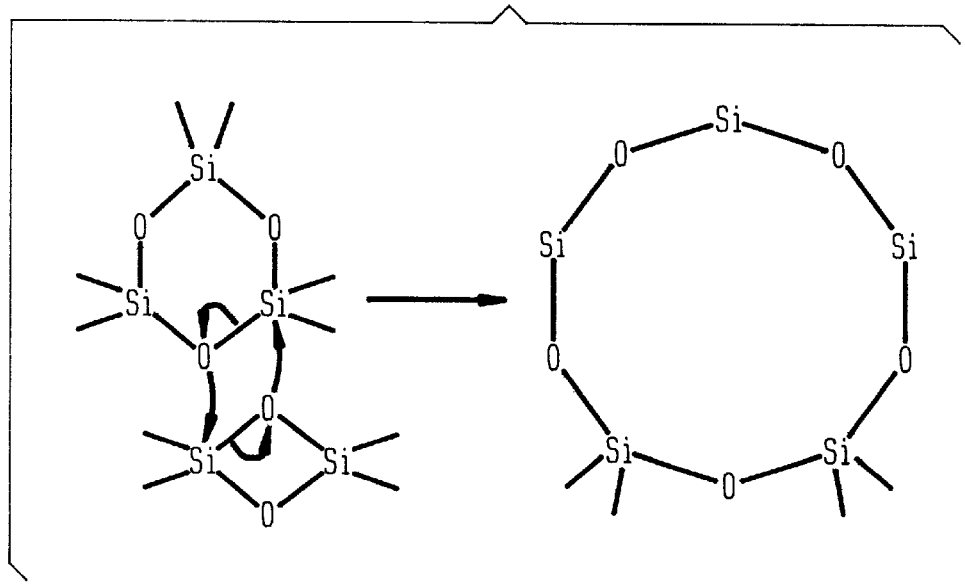
FIGS. 9 and 10 represent, using structural formulas, chemical reactions involving siloxane rings at glass surfaces.

We believe that additional, unreacted molecules of hMctS will fuse with the pinned rings. of FIG. 9, to produce even larger pinned rings. Adhesion of a polymeric coating to a surface treated in this manner will be enhanced by entanglement of the pinned rings with the polymer chains. We further believe that unstrained siloxane rings even larger than hMctS (such as the next larger analog, octamethyl cyclotetrasiloxane) will react with the strained dimer rings in a similar way. These larger cyclic compounds will also be useful for promoting adhesion.

Figure 10:
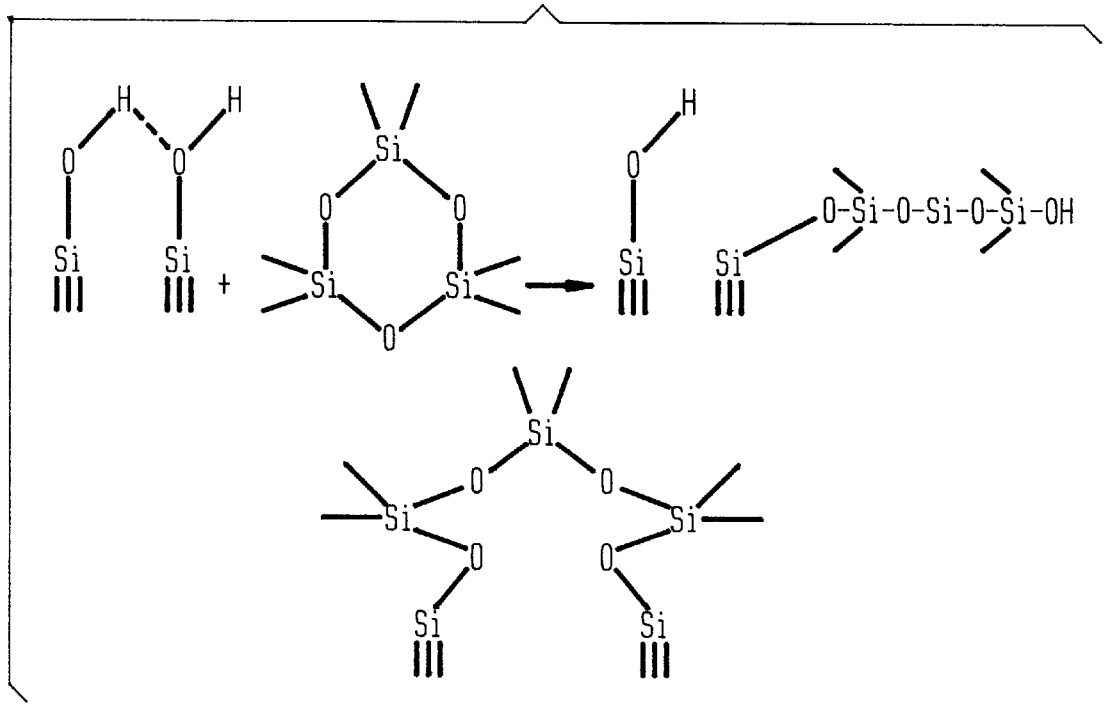

We have observed that hMctS will react, not only with the strained dimer rings, but also with residual hydroxyl groups attached to the silica surface. The reaction opens the hMctS ring to form a straight chain bonded to $\equiv$Si—O— at the surface and terminated by —Si—OH . Two of these terminal—Si—OH groups may condense, with the loss of a water molecule, to produce a doubly pinned, fused ring. These reactions are illustrated in FIG. 10. We have observed the trisiloxane ring-opening reaction even on silica surfaces that were treated with water to rehydroxylate them.

In the hMctS ring-opening reaction, a new O—H bond is formed, but there is no net increase in the number of O—H bonds at the glass surface.

EXAMPLE

We reacted water, EtS, tMdS, hMdS, and hMctS with high-surface-area silica obtained from the Cabot Corporation of Tuscola, Illinois. This silica has a surface area of $200\pm25 g/m^2$, and a structure composed of aggregates of dense spherical particles having a 7-nm mean particle radius.

The reactions were carried out in a turbo-pumped stainless steel vacuum chamber having a base pressure of $10^{-8}$ torr. The reactions were carried out at 480° K. This temperature was selected because it led to a measurable reaction rate for all of the chemicals we wished to observe, but was not high enough to cause pyrolysis of the reaction products.

Samples were prepared by depositing about 1.5–2 mg of silica in a colloidal suspension in methanol as a central stripe on a tungsten mesh covering an area of 1 $cm^2$. The mean sample thickness was about 8 $\mu$m. The samples were cleaned in situ by heating in the presence of oxygen at 500° C.

Prior to any surface reaction, the samples were heated in vacuo at 1050° C.–1100° C. for one hour, and then rapidly quenched to the reaction temperature of 480° K. This heating step brought the samples to the strain point for silica (approximately 1100° C., depending on the impurity level). Because viscous flow can occur at this temperature, we believe that the subsequent quenching step captured defects and their immediate surroundings in their high-temperature form.

Before performing the surface reactions, we took infrared spectra of the samples. Signature absorption peaks at 882 $cm^{-1}$ and 902 $cm^{-1}$ indicated the presence of strained dimer rings. Each sample was briefly (i.e., for 50–200 s) exposed to the reactant. The sample was then pumped free of reactant, and another infrared spectrum was taken. This sequence was cycled with exponentially increasing gas pressures, such that the complete set of exposures spanned six orders of magnitude of total dose.

Figure 11:
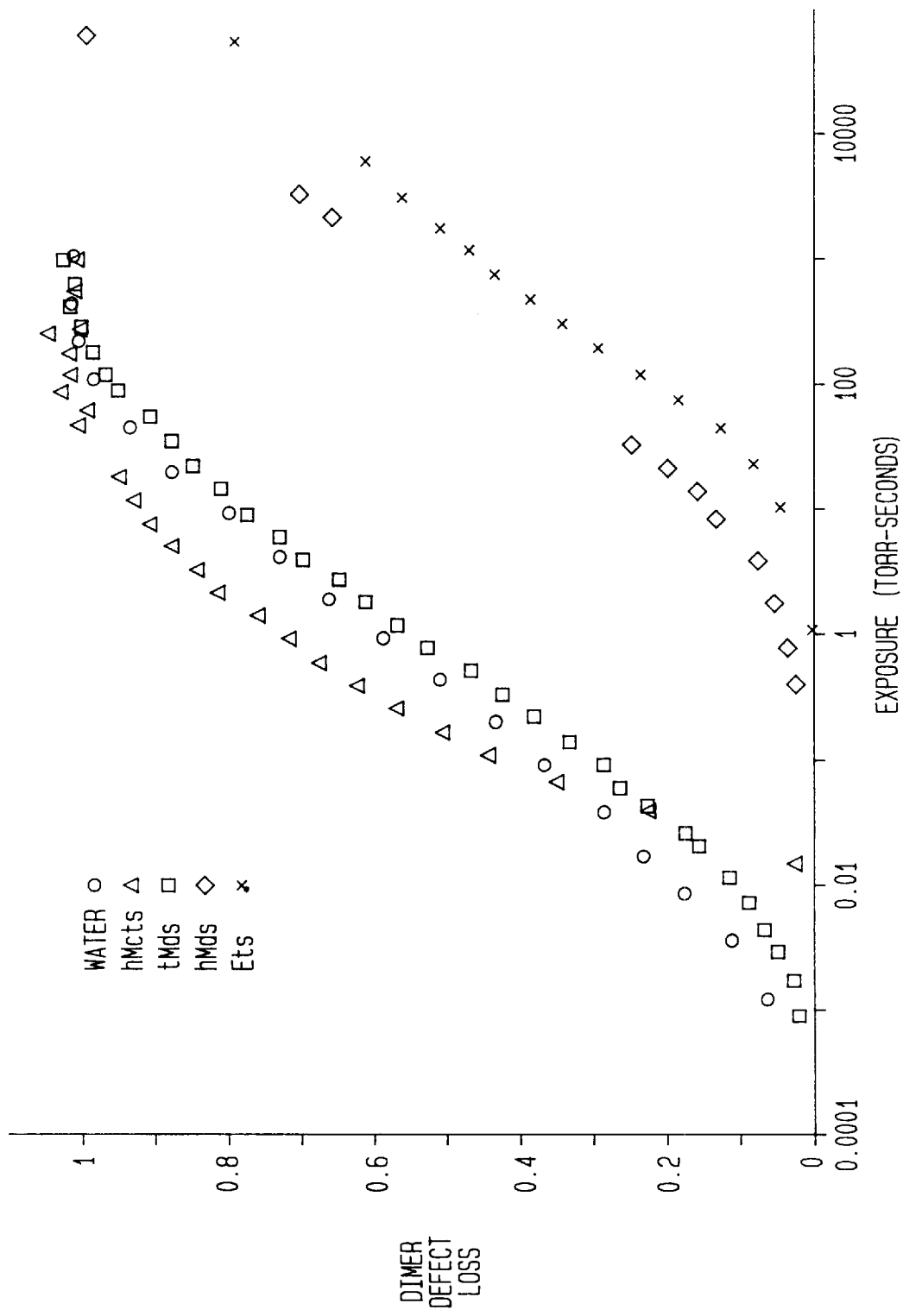
FIG. 11 is an experimental plot showing the extent of reaction, as a function of dose, for reactions between a glass surface and water and between a glass surface and each of four exemplary silane compounds.

FIG. 11 shows the extent of the surface reaction as a function of dose. The extents of the reactions with water and hMctS were measured by the attenuation of the infrared absorption peaks at 882 cm$^{-1}$ and 902 cm$^{-1}$. However, in the other cases, these absorption peaks were masked by the growth of interfering bands due to infrared absorption by certain functional groups on the reacting silanes. In these cases, we used infrared spectroscopic evidence of the growth of material on the surface to infer the degree to which defects were lost.

It is evident from the figure that a dose of about 200 torr-s produced a substantially complete reaction with water, hMctS, and tMdS.

We estimated that EtS reacts with dimer rings about 2200 times more slowly than tMdS, and it does not appear to react with surface hydroxyl groups at doses less than 6x 10$^4$ torr-s. We estimated that hMdS reacts about 600 times more slowly than tMdS, and it does not appear to react with surface hydroxyl groups. It is evident from the figure that hMctS reacts at a rate slightly faster than that of tMdS.

As noted above, we believe we have found evidence of a hMctS polymerizatidn reaction, and of reactivity of hMctS with residual surface hydroxyl groups. We have also noted that at 480° K., but not at 350° K., a polymerization reaction appears to take place between SiH at the surface and the Si—O bonds of gas-phase molecules of tMdS.

Significantly, the kinetic data displayed in FIG. 11 will be useful for estimating the exposures needed to obtain substantially complete surface reactions with a broad range of reactive compounds. That is, the reactive center of each of the compounds listed in the Appendix has the siloxane structure Si—O—Si or (in the case of the SiH$_4$ derivatives) the organo-H-silane structure Si—H. Neglecting, for now, the effect of steric hindrance, the tMdS reaction is expected to typify the rates to be expected with the first of these structures, and the EtS reaction is expected to typify those rates expected with the second structure. As noted, hMdS reacts more slowly than tMdS. We attribute this primarily to steric hindrance. Because hMdS is a highly hindered molecule, we believe that the hMdS reaction typifies the slowest rates, associated with the most hindered siloxane compounds that will have useful application in the practice of our invention. Accordingly, we expect effective total exposure values to span a range of about three orders of magnitude from siloxane compounds to comparably hindered organo-H—silane compounds, and to span a range of about three orders of magnitude from minimally hindered to highly hindered compounds of either class.

In addition to the four compounds discussed above, we measured reaction rates between silica and the compounds: tris-triMethylSiloxySilane; 1,1,3,3-tetraMethyldiSilazane; 1,3-diVinyltetraMethyldiSilazane; VinyldiMethylEthoxySilane; and tetraEthylSilane. The reactivities of these compounds were roughly as would be expected from the above discussion. As a group, these reactivities spanned a range of about six orders of magnitude.

APPENDIX (Note: As Used Herein, "HydroSiloxane" Denotes a Siloxane that Contains the SiH Group.)

A. HexaMethyldiSiloxane and its Derivatives:
   hexaMethyldiSiloxane
   1,1,3,3 tetraMethyldiSiloxane
   1,1,3,3 tetraVinyldiMethyldiSiloxane
   1,3 di(3-AminoPropyl)diMethyldiSiloxane
   1,3 di(3-MercaptoPropyl)diMethyldiSiloxane
   1,3 diBenzyltetraMethyldiSiloxane
   1,3 diPhenyl 1,1,3,3 tetrakis(diMethylSiloxy)diSiloxane
   1,3 diPhenyltetraMethyldiSiloxane
   1,3 diVinyl 1,3 diPhenyl 1,3 diMethyldiSiloxane
   1,3 diVinyl tetraMethyldiSiloxane
   hexaEthyldiSiloxane
   tris-(triMethylSiloxy)Silane B. CycloSiloxane Derivatives:
   the MethylHydrocycloSiloxanes
   hexaMethylcyclotriSiloxane
   isomers of tri(MethylHydro)cyclotriSiloxane
   pentaMethylcyclotriSiloxane
   1,3,5,7 tetraVinyltetraMethylcyclotetraSiloxane
   hexaEthylcyclowriSiloxane C. Derivatives of Silane (SiH$_4$)
   EthylSilane
   diMethylsilane
   diEthylSilane
   diEthylMethylSilane D. Derivatives and Oligomers of polydiMethylSiloxane
   the (MethylHydro)poiySiloxanes
   1,1,3,3,5 hexaMethyltriSiloxane

We claim:

1. A method for chemically modifying the surfaces of fumed silica particles made in a burner comprising the steps of:

a) collecting the particles from an outlet of the burner, b) without exposing the particles to any substantial dose of water vapor, passing the particles from the outlet into and through a reaction zone containing a controlled atmosphere that comprises at least one silicon compound selected from the group consisting of: silane and its ethyl, dimethyl, diethyl, and diethylmethyl derivatives, the siloxanes and their analogs, the cyclosiloxanes and their analogs, the organo-H-silanes and their analogs, and the organosiloxanes and their analogs;

c) said group excludes all alkoxysilanes and their analogs, all chlorosilanes and their analogs, all silazanes and their analogs, and all silamines and their analogs, and d) reacting said particles with the silicon compound.

* * * * *